US012791819B2

(12) United States Patent
Cheng et al.

(10) Patent No.: US 12,791,819 B2
(45) Date of Patent: Nov. 10, 2026

(54) SWITCHING MECHANISM

(71) Applicant: TDK CORPORATION, Tokyo (JP)

(72) Inventors: Pai-Jui Cheng, Taoyuan City (TW); Shu-Shan Chen, Taoyuan City (TW); June-Yue Hou, Taoyuan City (TW); Chuan-Min Lee, Taoyuan City (TW)

(73) Assignee: TDK CORPORATION, Tokyo (JP)

( * ) Notice: Subject to any disclaimer, the term of this patent is extended or adjusted under 35 U.S.C. 154(b) by 134 days.

(21) Appl. No.: 18/896,589

(22) Filed: Sep. 25, 2024

(65) Prior Publication Data

US 2025/0102885 A1 Mar. 27, 2025

Related U.S. Application Data

(60) Provisional application No. 63/584,983, filed on Sep. 25, 2023.

(51) Int. Cl.
*G02B 7/02* (2021.01)
*G02B 5/00* (2006.01)
(Continued)

(52) U.S. Cl.
CPC ............... *G02B 7/02* (2013.01); *G02B 5/005* (2013.01); *G02B 7/09* (2013.01); *G02B 27/64* (2013.01); *G03B 3/10* (2013.01); *G03B 7/095* (2013.01); *G03B 9/42* (2013.01); *G03B 11/043* (2013.01); *G06F 1/1677* (2013.01); *H02K 41/0354* (2013.01)

(58) Field of Classification Search
CPC . G02B 7/02; G02B 5/005; G02B 7/09; G02B 27/64; G02B 7/08; G02B 27/646; G03B 3/10; G03B 7/095; G03B 9/42; G03B 11/043; G03B 2205/0069; G03B 30/00; G06F 1/1677; H02K 41/0354; H02K 41/0356
See application file for complete search history.

(56) References Cited

U.S. PATENT DOCUMENTS 11,178,319 B2 * 11/2021 Li .......................... H04N 23/57
11,681,204 B2 * 6/2023 Huang ................. G03B 11/043 396/448
(Continued)

FOREIGN PATENT DOCUMENTS

CN 218350584 U 1/2023

OTHER PUBLICATIONS

Office Action issued on Aug. 8, 2025 for the corresponding CN Application No. 202422341491.8 (1 page).

*Primary Examiner* — Shahbaz Nazrul
(74) *Attorney, Agent, or Firm* — MUNCY, GEISSLER, OLDS & LOWE, P.C.

(57) ABSTRACT

A switching mechanism is provided. The switching mechanism includes a movable portion, a fixed portion, and a driving assembly. The movable portion is movable relative to the fixed portion. The driving assembly is configured to drive the movable portion to move. The switching mechanism can further include a sensing assembly configured to detect the condition of the movable portion. The sensing assembly includes a first reference object and a first sensing member. The first sensing member corresponds to the first reference object, and the first reference object is adjacent to the first sensing member when the movable portion is in a first condition.

17 Claims, 9 Drawing Sheets

(51) Int. Cl.

| | |
|---|---|
| ***G02B 7/09*** | (2021.01) |
| ***G02B 27/64*** | (2006.01) |
| ***G03B 3/10*** | (2021.01) |
| ***G03B 7/095*** | (2021.01) |
| ***G03B 9/42*** | (2021.01) |
| ***G03B 11/04*** | (2021.01) |
| ***G06F 1/16*** | (2006.01) |
| ***H02K 41/035*** | (2006.01) |

(56) References Cited

U.S. PATENT DOCUMENTS

| | | | | |
|---|---|---|---|---|
| 11,921,403 | B2 * | 3/2024 | Ushio | G06F 1/1684 |
| 12,517,416 | B2 * | 1/2026 | Sawanobori | G03B 11/043 |
| 2020/0249415 | A1 * | 8/2020 | Wang | G03B 11/043 |
| 2021/0349374 | A1 * | 11/2021 | Hung | G06F 1/1686 |
| 2022/0236626 | A1 * | 7/2022 | Lin | G03B 11/043 |
| 2024/0094606 | A1 * | 3/2024 | Suzuki | G03B 11/045 |

* cited by examiner

A-A

SWITCHING MECHANISM

CROSS REFERENCE TO RELATED APPLICATIONS

This application claims the benefit of U.S. Provisional Application No. 63/584,983, filed Sep. 25, 2023, the entirety of which is incorporated by reference herein.

BACKGROUND OF THE INVENTION

Field of the Invention

The application relates in general to a switching mechanism, and in particular it relates to a switching mechanism for switching among different conditions.

Description of the Related Art

Recently, a lot of electronic devices are equipped with an apparatus that is able to take photographs. However, the camera lenses in the aforementioned type of apparatus are usually exposed, and they may be operated at inopportune times (for example, when the user opens it accidently, or when a hacker takes control of it). This poses a potential risk to the user's privacy. Therefore, how to address the aforementioned problem has become an important issue.

BRIEF SUMMARY OF INVENTION

An embodiment of the invention provides a switching mechanism, including a movable portion, a fixed portion, and a driving assembly. The movable portion is movable relative to the fixed portion. The driving assembly is configured to drive the movable portion to move.

In some embodiments, the switching mechanism can further include a sensing assembly, configured to detect the condition of the movable portion. The sensing assembly includes a first reference object and a first sensing member. The first sensing member corresponds to the first reference object, and the first reference object is adjacent to the first sensing member when the movable portion is in a first condition.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF INVENTION

The making and using of the embodiments of the switching mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The following disclosure provides many different embodiments, or examples, for implementing different features of the subject matter provided. Specific examples of solutions and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
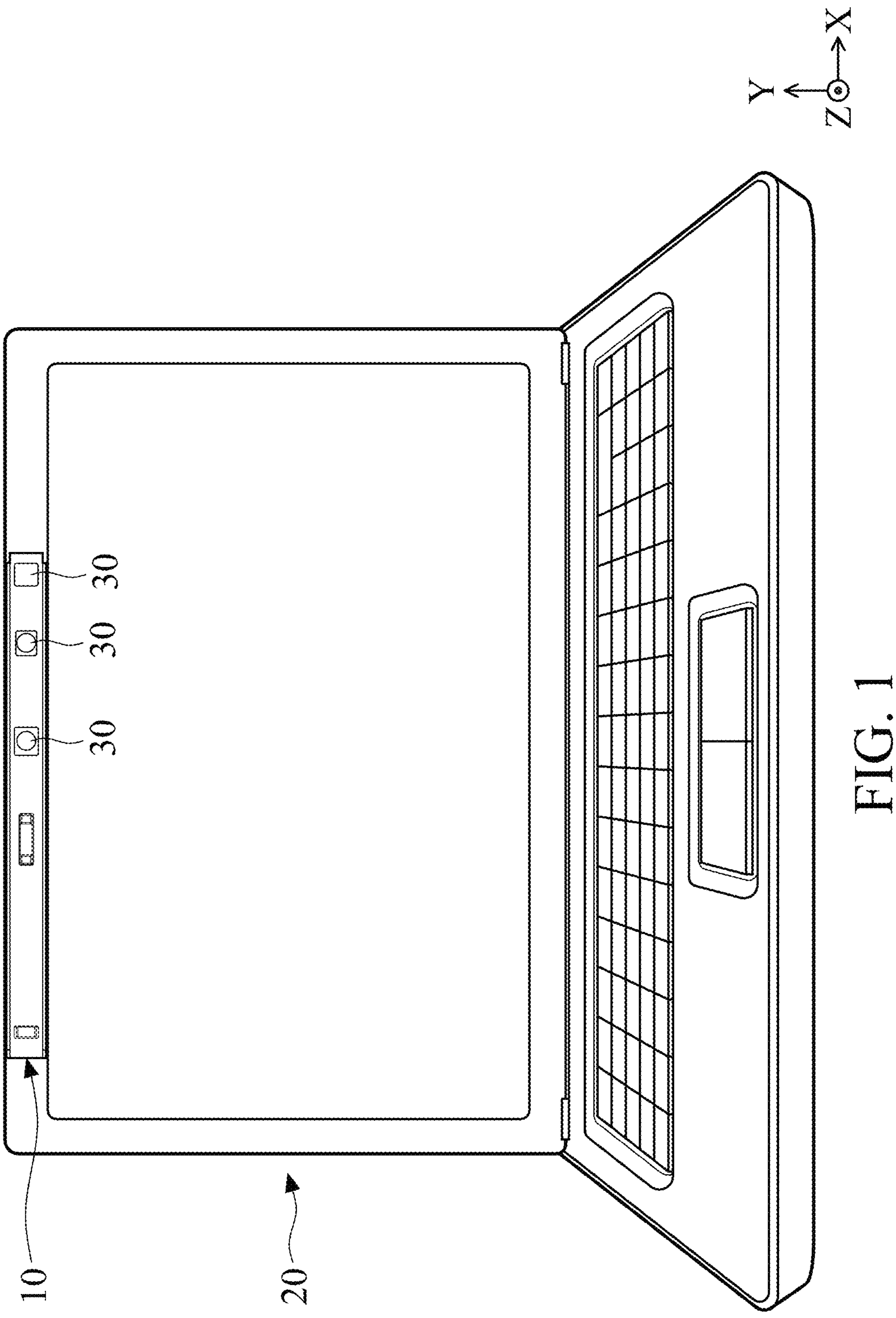
FIG. 1 is a schematic diagram of a switching mechanism disposed on an electronic device according to an embodiment of the invention.

Referring to FIG. 1, a switching mechanism 10 according to an embodiment of the invention can be disposed in an electronic device 20, and can correspond to at least one optical module 30 on the electronic device 20. The electronic device 20 can be a notebook computer, a tablet computer, or a smartphone, and the optical module 30 can include a video camera that is used to photograph or an infrared sensor that is used to detect, but it is not limited thereto. The switching mechanism 10 can switch the optical module 30 in different modes. For example, when the user does not need to use the optical module 30, the switching mechanism 10 can block the optical module 30, so as to prevent the optical module 30 from photographing in the undesired condition. When the user needs to use the optical module 30, the switching mechanism 10 can switch to expose the optical module 30, the optical module 30 is no longer covered and the photograph process can be applied. Alternatively, the electronic devices 20 can include two or more optical modules 30 disposed thereon, and the switching mechanism 10 can switch to expose different optical modules 30 in different modes.

Figure 2:
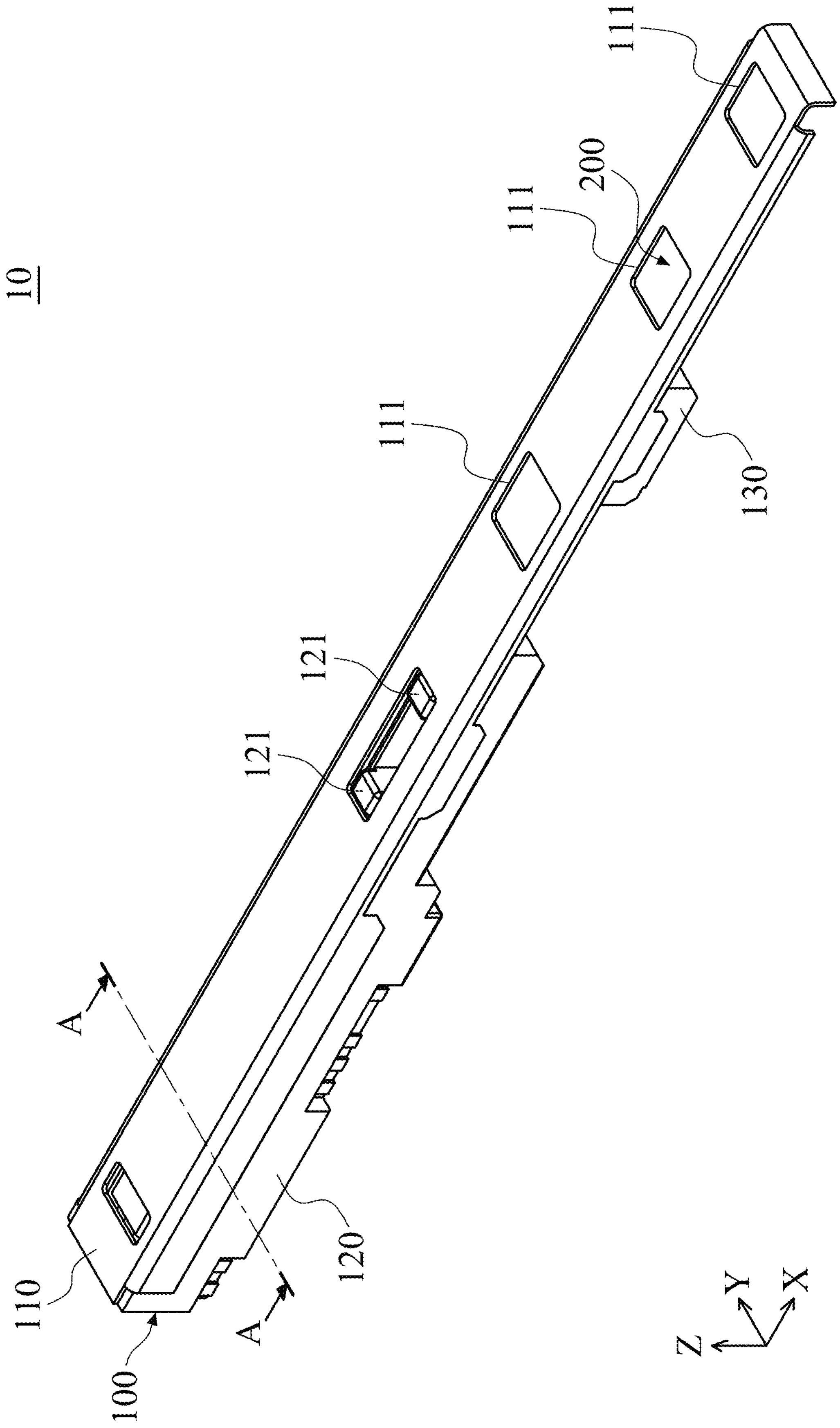
FIG. 2 is a schematic diagram of the switching mechanism according to an embodiment of the invention.
Figure 3:
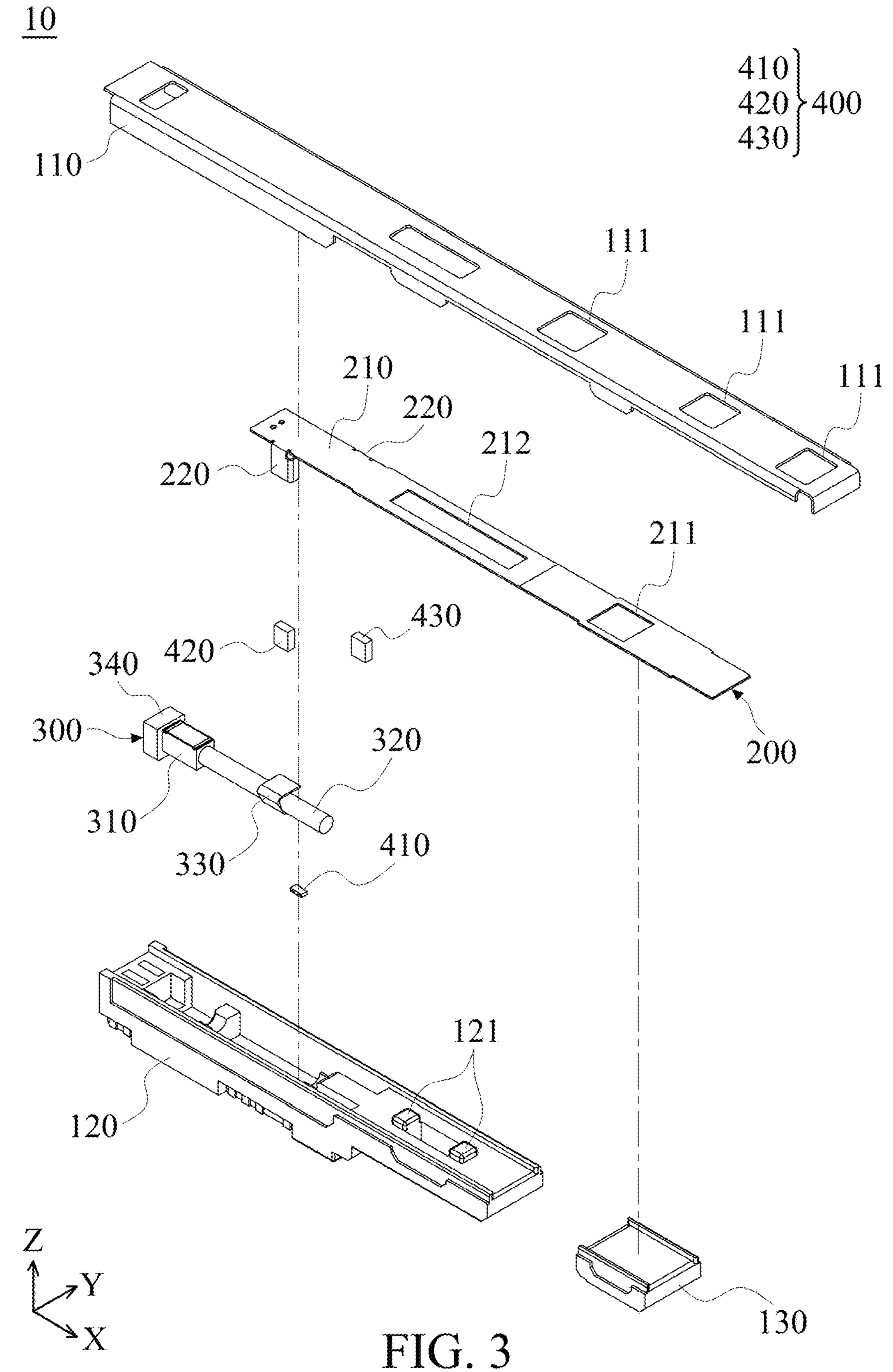
FIG. 3 is an exploded-view diagram of the switching mechanism according to an embodiment of the invention.

FIG. 2 is a schematic diagram of the switching mechanism 10 according to an embodiment of the invention, and FIG. 3 is an exploded-view diagram of the optical member driving mechanism 10. As shown in FIG. 2 and FIG. 3, the switching mechanism 10 primarily includes a fixed portion 100, a movable portion 200, a driving assembly 300, and a sensing assembly 400.

The fixed portion 100 can be affixed to the case of the electronic device 20, and can include a cover 110, a base 120, and a supporting member 130. The cover 110 can include one or more openings 111. The position of the opening 111 can correspond to the position of the optical module 30. The base 120 and the supporting member 130 can be connected to the cover 110 on a side of the cover 110, and the base 120 is spaced away from the supporting member 130. When the base 120 and the supporting member 130 are connected to the cover 110, a gap is formed between the base 120 and the cover 110, and a gap is formed between the supporting member 130 and the cover 110. Moreover, the base 120 can include at least one position-limiting pillar 121 extending toward the cover 110.

The movable portion 200 includes a plate section 210 and two connecting sections 220. The plate section 210 can be inserted into the gap between the base 120 and the cover 110 and the gap between the supporting member 130 and the cover 110. Therefore, the movable portion 200 can be movably disposed between the base 120 and the cover 110 and movably disposed between the supporting member 130 and the cover 110. The plate section 210 has one or more openings 211 and a guiding slot 212. The position-limiting pillar 121 can pass through the guiding slot 212 to restrict the moving range of the movable portion 200. The connecting sections 220 are connected to the plate section 210, and are extended toward the base 120.

The driving assembly 300 includes a driving source 310, a transferring member 320, and a clamp member 330. The driving source 310 can generate a driving force, and the transferring member 320 is connected to the driving source to transfer the driving force to the movable portion 200. The clamp member 330 can be an elastic sheet. The clamp member 330 is fixedly connected to the movable portion 20 and clamps the transferring member 320. The clamp member 330 can provide a fixing force to the movable portion, so that the movable portion 200 is fixed relative to the fixed portion 100 when the driving assembly 300 does not drive the movable portion 200 to move.

For example, the driving source 310 can be a piezoelectric member. When the current flows through the driving source 310, the driving source 310 can be deformed. The driving source 310 can be slowly deformed to push the transferring member 320 and the clamp member 330 to move, and then can be quickly deformed to the original shape. Thereby, the position of the clamp member 330 on the transferring member 320 can be changed, and the movable portion 200 can be driven to displace relative to the fixed portion 100.

In this embodiment, the driving assembly 300 further includes an enhancing member 340 affixed to the base 120, and the driving source 310 is disposed between the enhancing member 340 and the transferring member 320. The enhancing member 340 includes material with sufficient rigidity, so that the driving source 310 is merely deformed toward the transferring member 320, and the driving force of the driving source 310 can be enhanced.

Figure 4:
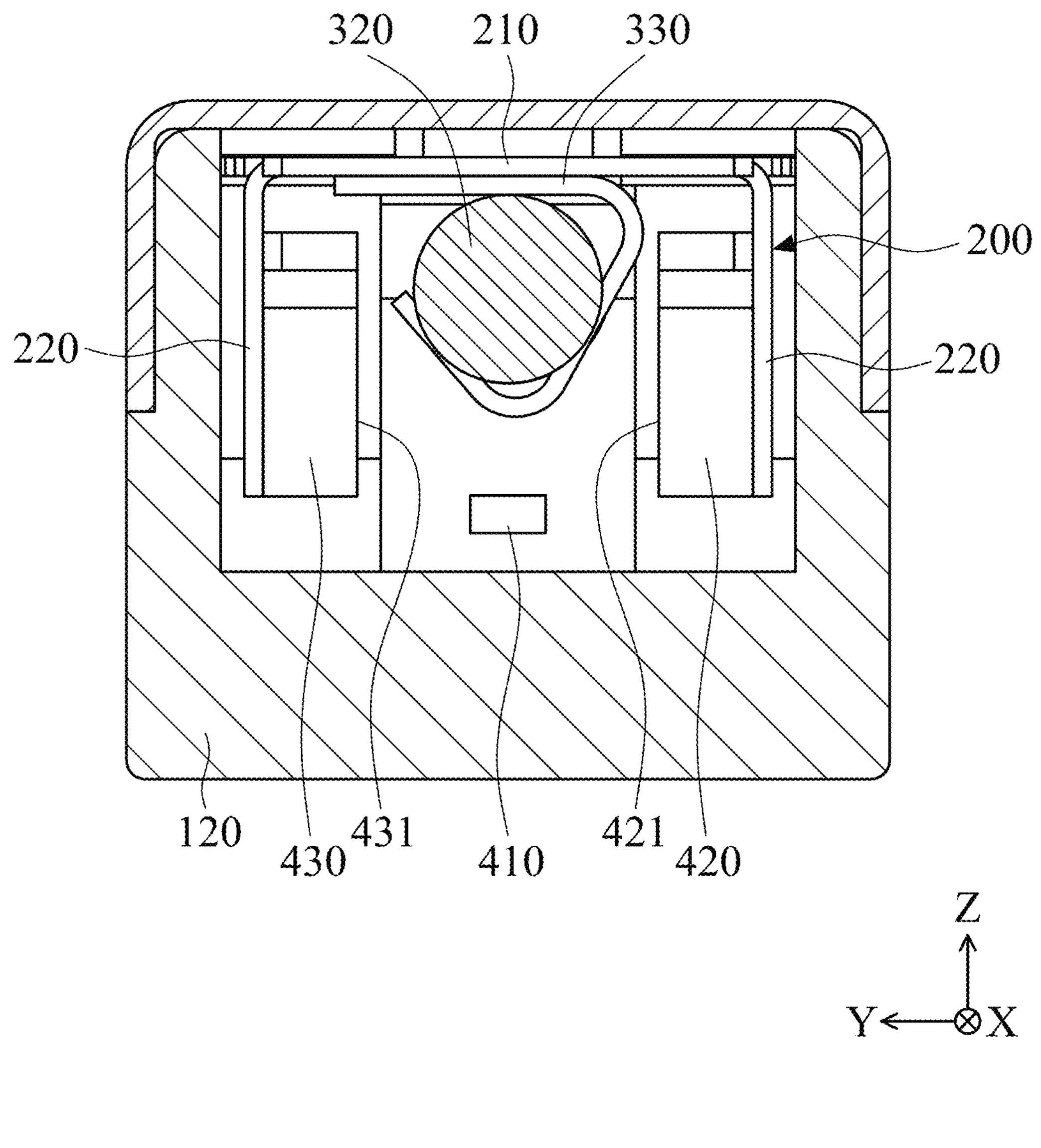
FIG. 4 is a cross-sectional view taken along the line A-A in FIG. 2.

FIG. 4 is a cross-sectional view taken along the line A-A in FIG. 2. As shown in FIG. 2 to FIG. 4, the sensing assembly 400 includes a first sensing member 410, a first reference object 420, and a second reference object 430. The first sensing member 410 is disposed on the base 120 of the fixed portion 100. The first reference object 420 and the second reference object 430 are respectively disposed on the two connecting sections 220 and correspond to the first sensing member 410.

For example, the first sensing member 410 can be a Hall sensor, a magnetoresistance effect sensor (MR sensor), a giant magnetoresistance effect sensor (GMR sensor), a tunneling magnetoresistance effect sensor (TMR sensor), or a fluxgate sensor, and each of the first reference object 420 and the second reference object 430 can be a magnet.

The first reference object 420 has a first surface 421 facing the first sensing member 410, the second reference object 430 has a second surface 431 facing the first sensing member 431, and the first surface 421 and the second surface 431 face the opposite directions. The first sensing member 410 includes a plate structure, and its thickness direction is not perpendicular to the first surface 421 and the second surface 431. As observed from the thickness direction of the first sensing member 410 (i.e. the Z-axis in the figures), the first sensing member 410 and the first reference object 420 do not overlap, the first sensing member 410 and the second reference object 430 do not overlap, and the first reference object 420 and the second reference object 430 do not overlap.

Figure 5A:
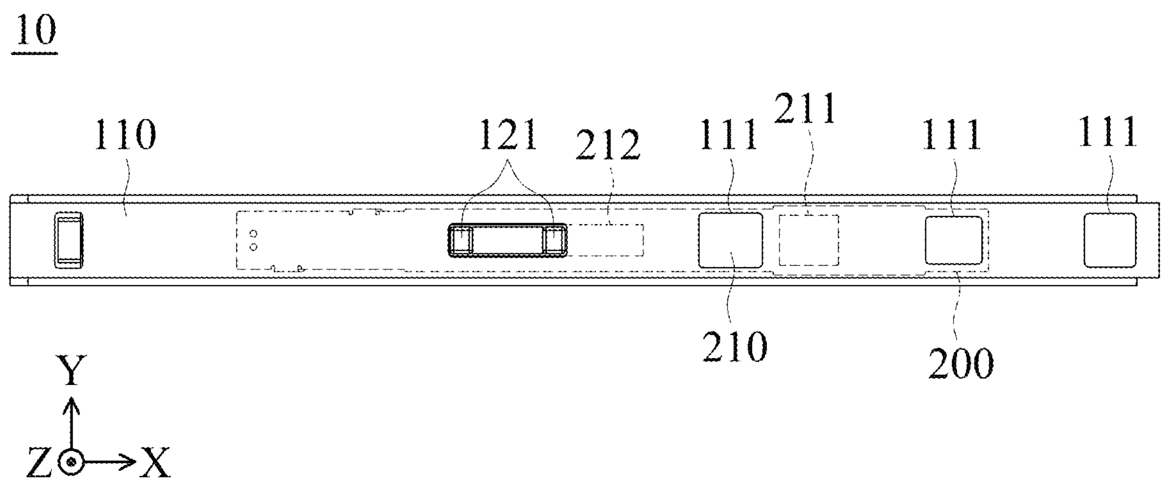
FIG. 5A is a schematic diagram of a movable portion and a fixed portion when the movable portion is in a first condition relative to the fixed portion according to an embodiment of the invention.
Figure 5B:
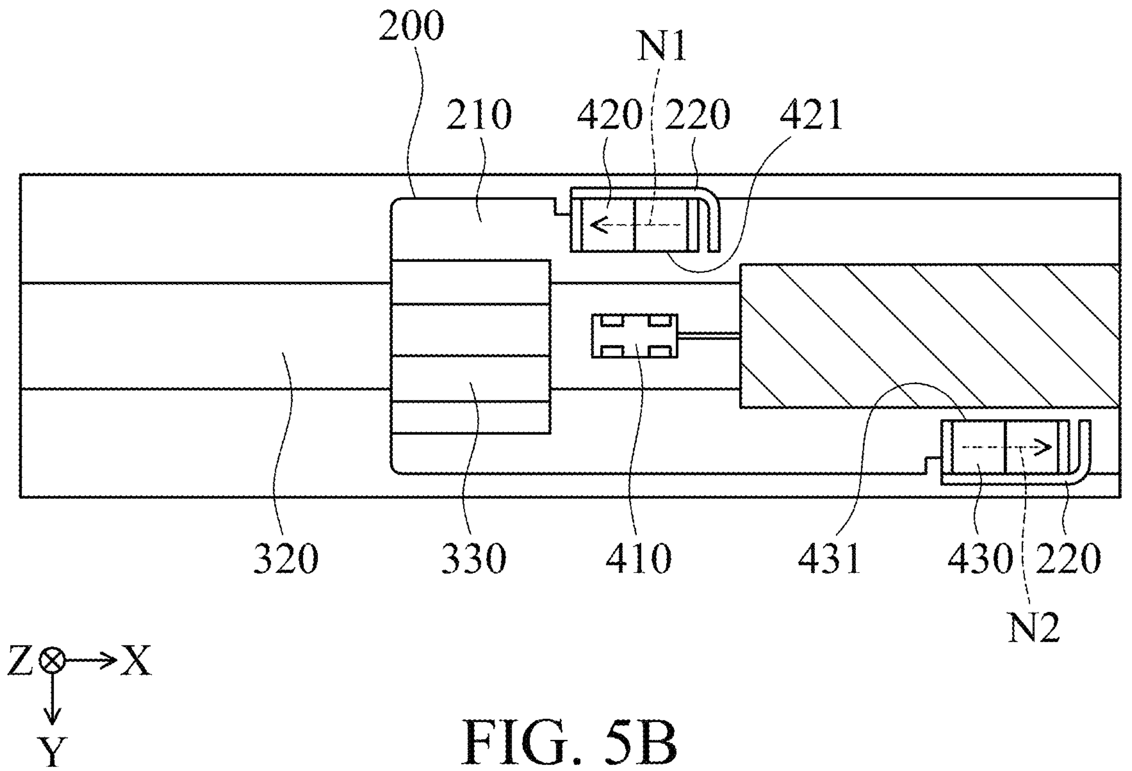
FIG. 5B is a schematic diagram of a sensing assembly when the movable portion is in the first condition relative to the fixed portion according to an embodiment of the invention.

Referring to FIG. 5A and FIG. 5B, when the movable portion 200 is in a first condition relative to the fixed portion 100, the opening 211 of the plate section 210 is not aligned with the opening 111 of the cover 110, so that optical module 30 is covered by the movable portion 200. At this time, the first reference object 420 is adjacent to the first sensing member 410, and the first reference object 420 at least partially overlaps the first sensing member 410 as observed from the direction perpendicular to the first surface 421 of the first reference object 420. Therefore, the first sensing member 410 can detect the magnetic field of the first reference object 420, so as to ensure that the movable portion 200 is in the first condition relative to the fixed portion 100.

Figure 6A:
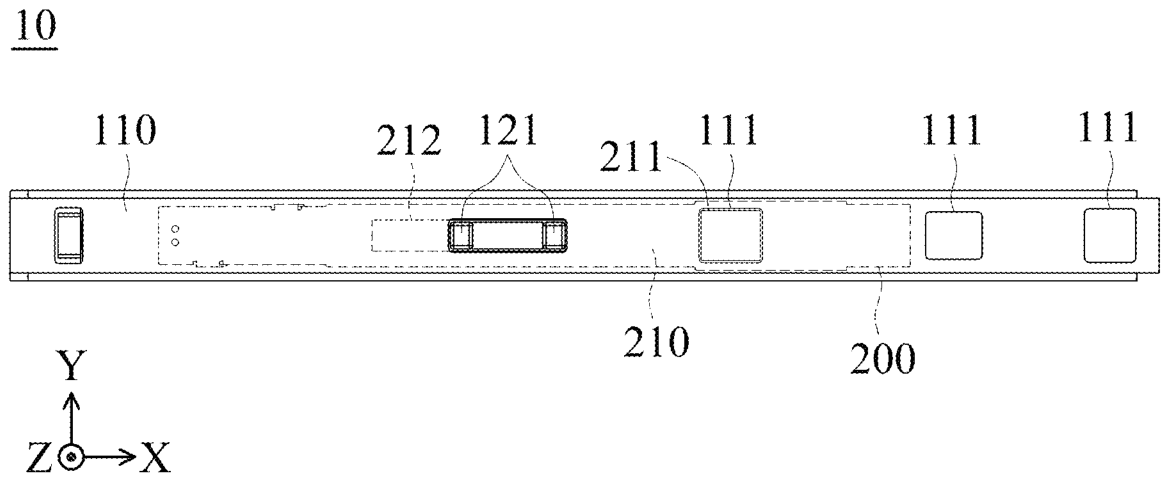
FIG. 6A is a schematic diagram of the movable portion and the fixed portion when the movable portion is in a second condition relative to the fixed portion according to an embodiment of the invention.
Figure 6B:
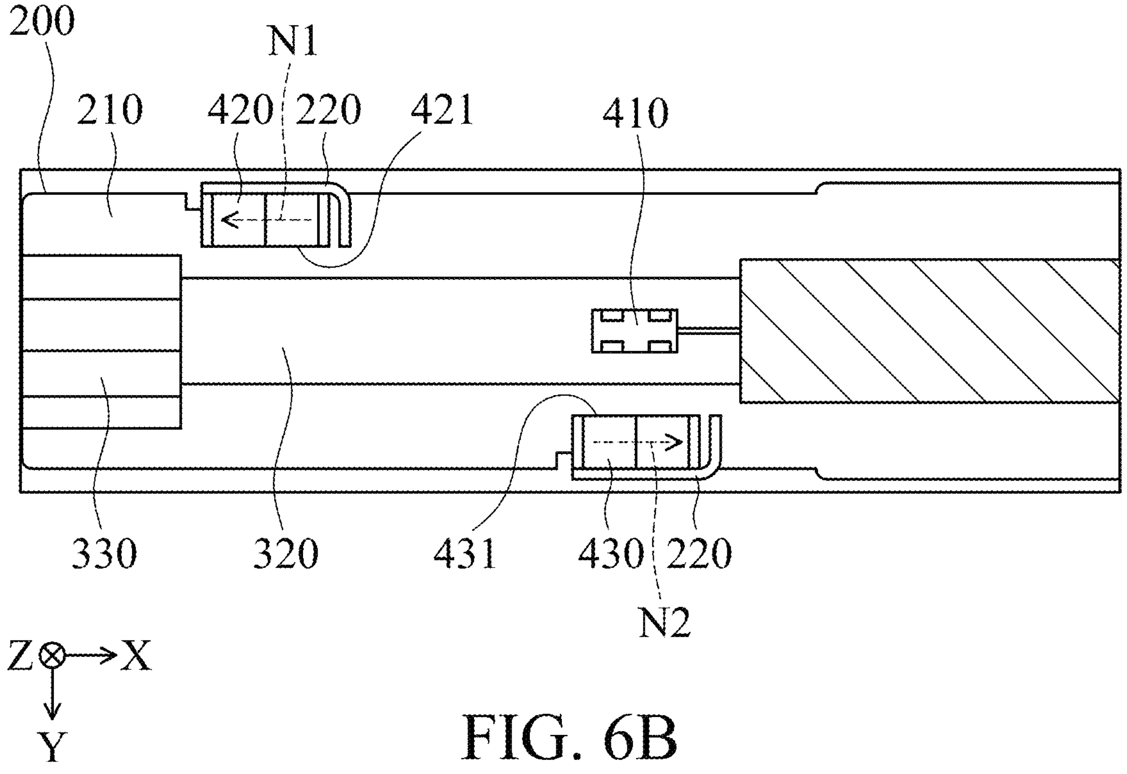
FIG. 6B is a schematic diagram of the sensing assembly when the movable portion is in the second condition relative to the fixed portion according to an embodiment of the invention.

Referring to FIG. 6A and FIG. 6B, when the driving assembly 300 drives the movable portion 200 to move and changes the movable portion 200 from first condition to a second condition relative to the fixed portion 100, the opening 211 of the plate section 210 is aligned with the opening 111 of the cover 110, or the opening 111 of the cover 110 is no longer covered. Thus, the optical module 300 can be exposed from the switching mechanism 10. At this time, the second reference object 430 is adjacent to the first sensing member 410, and the second reference object 430 at least partially overlaps the first sensing member 410 as observed from the direction perpendicular to the second surface 431 of the second reference object 430. Therefore, the first sensing member 410 can detect the magnetic field of the second reference object 430, so as to ensure that the movable portion 200 is in the second condition relative to the fixed portion 100.

It should be noted that, the direction of the magnetic line N1 inside the first reference object 420 and the direction of the magnetic line N2 inside the second reference object 430 can be parallel to the longitudinal direction of the transferring member 320 (i.e. the moving direction of the movable portion 200), and the direction of the magnetic line N1 can be opposite to the direction of the magnetic line N2, so as to enhance the detecting accuracy of the sensing assembly 400.

Referring to FIG. 7A to FIG. 9B, in another embodiment of the invention, the switching mechanism 10 can be switched between three different modes. In this embodiment, the switching mechanism 10 further includes a filter 500 disposed on one opening 211 of the movable portion 200. In some embodiments, the filter 500 can be replaced by the lens or the prism, but it is not limited thereto.

Figure 7A:
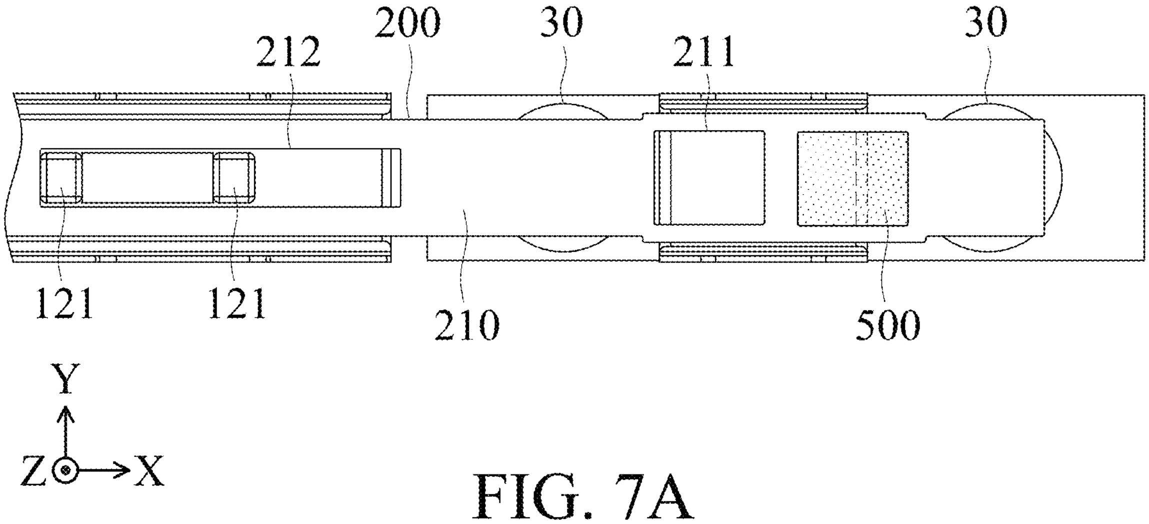
FIG. 7A is a schematic diagram of the movable portion and the optical modules when the movable portion is in a first condition relative to the fixed portion according to another embodiment of the invention.
Figure 7B:
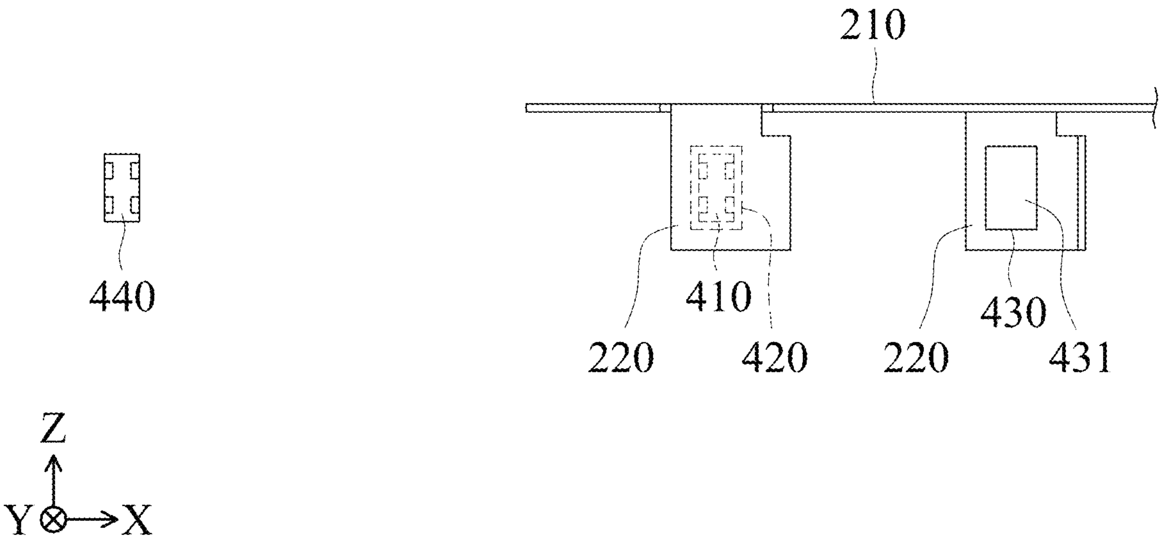
FIG. 7B is a schematic diagram of the sensing assembly when the movable portion is in the first condition relative to the fixed portion according to another embodiment of the invention.

As shown in FIG. 7A and FIG. 7B, in this embodiment, the sensing assembly 400 further includes a second sensing member 440. The first sensing member 410 and the second sensing member 440 are substantially arranged along the longitudinal direction of the transferring member 320, and the distance between the first sensing member 410 and the second sensing member 440 is greater than the distance between the first reference object 420 and the second reference object 430.

In FIG. 7A and FIG. 7B, the movable portion 200 is in a first condition relative to the fixed portion 100, and the optical modules 30 are covered by the movable portion 200 at this time. The first reference object 420 is adjacent to the first sensing member 410, and the first reference object 420 at least partially overlaps the first sensing member 410 as observed from the direction perpendicular to the first surface 421 of the first reference object 420 which faces the first sensing member 410. Therefore, the first sensing member 410 can detect the magnetic field of the first reference object 420, so as to ensure that the movable portion 200 is in the first condition relative to the fixed portion 100.

Figure 8A:
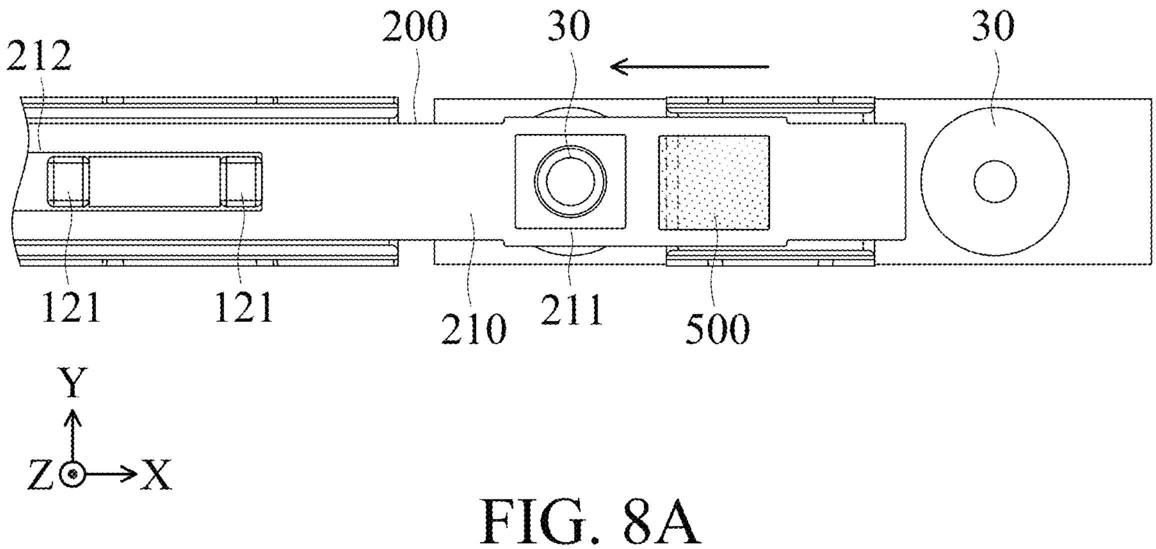
FIG. 8A is a schematic diagram of the movable portion and the optical modules when the movable portion is in a second condition relative to the fixed portion according to another embodiment of the invention.
Figure 8B:
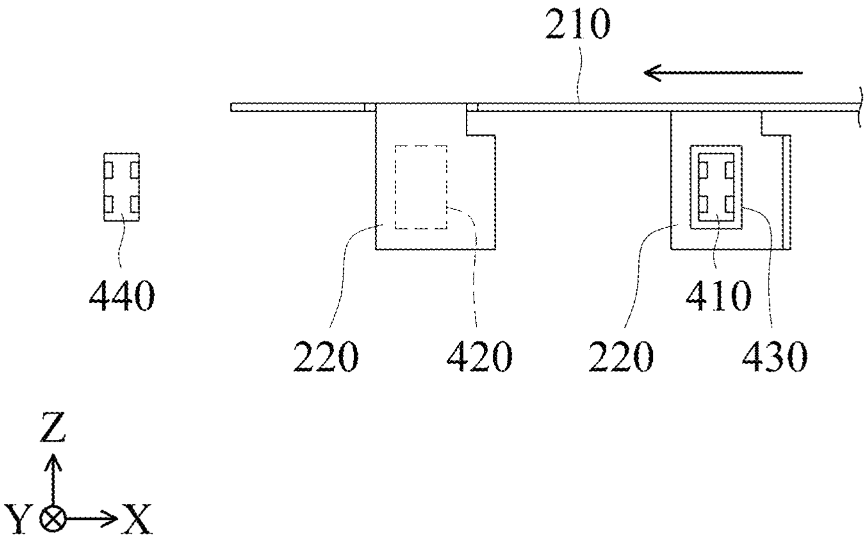
FIG. 8B is a schematic diagram of the sensing assembly when the movable portion is in the second condition relative to the fixed portion according to another embodiment of the invention.

In FIG. 8A and FIG. 8B, the driving assembly 300 drives the movable portion 200 to move and changes the movable portion 200 from the first condition to a second condition relative to the fixed portion 100. When the movable portion 200 is in the second condition relative to the fixed portion 100, the optical modules 30 are exposed from the movable portion 200. The second reference object 430 is adjacent to the first sensing member 410, and the second reference object 430 at least partially overlaps the first sensing member 410 as observed from the direction perpendicular to the second surface 431 of the second reference object 430 which faces the first sensing member 410. Therefore, the first sensing member 410 can detect the magnetic field of the second reference object 430, so as to ensure that the movable portion 200 is in the second condition relative to the fixed portion 100.

Figure 9A:
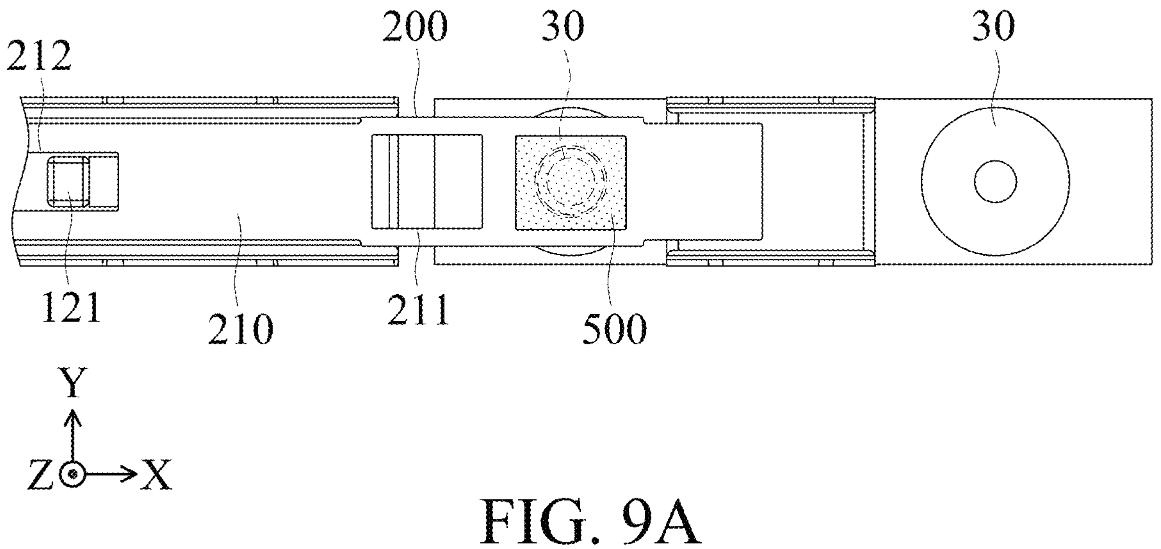
FIG. 9A is a schematic diagram of the movable portion and the optical modules when the movable portion is in a third condition relative to the fixed portion according to another embodiment of the invention.
Figure 9B:
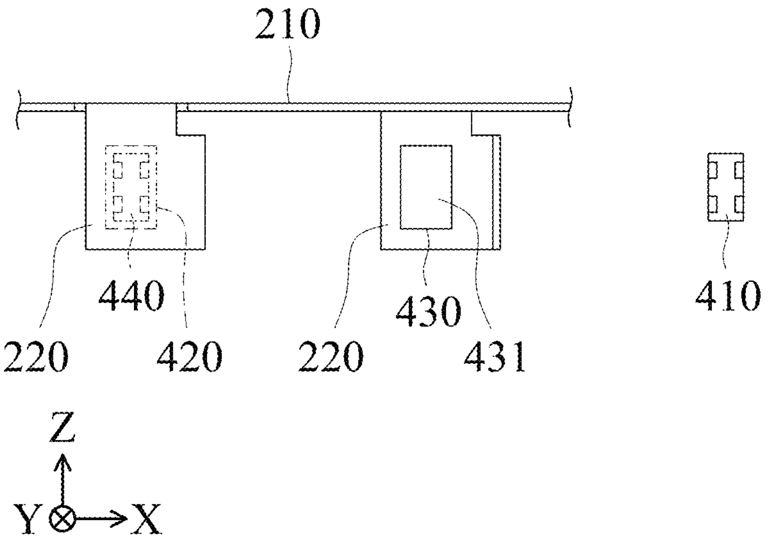
FIG. 9B is a schematic diagram of the sensing assembly when the movable portion is in the third condition relative to the fixed portion according to another embodiment of the invention.

In FIG. 9A and FIG. 9B, the driving assembly 300 drives the movable portion 200 to move and changes the movable portion 200 from the second condition to a third condition relative to the fixed portion 100. When the movable portion 200 is in the third condition relative to the fixed portion 100, the opening 211 of the movable portion 200 with the filter 500 is aligned with one of the optical modules 30. The first reference object 420 is adjacent to the second sensing member 440, and the first reference object 420 at least partially overlaps the second sensing member 440 as observed from the direction perpendicular to the first surface 421 of the first reference object 420 which faces the second sensing member 440. Therefore, the second sensing member 440 can detect the magnetic field of the first reference object 420, so as to ensure that the movable portion 200 is in the third condition relative to the fixed portion 100.

In this embodiment, the direction of the magnetic line inside the first reference object 420 and the direction of the magnetic line inside the second reference object 430 can be perpendicular to the longitudinal direction of the transferring member 320 (i.e. the moving direction of the movable portion 200), and the magnetic pole on the first surface 421 of the first reference object 420 facing the first and second sensing members 410 and 440 is opposite to the magnetic pole on the second surface 431 of the second reference object 430 facing the first and second sensing members 410 and 440, so as to enhance the detecting accuracy of the sensing assembly 400.

The features between the aforementioned embodiments can be used or combined as long as they do not violate or conflict the spirit of the present application.

In summary, an embodiment of the invention provides a switching mechanism, including a movable portion, a fixed portion, and a driving assembly. The movable portion is movable relative to the fixed portion. The driving assembly is configured to drive the movable portion to move.

The switching mechanism can further include a sensing assembly, configured to detect the condition of the movable portion. The sensing assembly includes a first reference object and a first sensing member. The first sensing member corresponds to the first reference object, and the first reference object is adjacent to the first sensing member when the movable portion is in a first condition.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A switching mechanism, comprising:

a movable portion;

a fixed portion, wherein the movable portion is movable relative to the fixed portion;

a driving assembly, configured to drive the movable portion to move;

a sensing assembly, configured to detect the condition of the movable portion, and comprising:

a first reference object;

a first sensing member, corresponding to the first reference object and having a first surface facing the first sensing member, wherein the first reference object is adjacent to the first sensing member when the movable portion is in a first condition; and a second sensing member corresponding to the first reference object, wherein:

the first sensing member has a plate structure, and a thickness direction of the first sensing member is not perpendicular to the first surface, as observed from the thickness direction of the first sensing member, the first sensing member and the first reference object do not overlap, when the movable portion is in the first condition, the first reference object at least partially overlaps the first sensing member as observed from a direction that is perpendicular to the first surface, when the movable portion is in a third condition, the first reference object is adjacent to the second sensing member, and when the movable portion is in the third condition, the first reference object at least partially overlaps the second sensing member as observed from the direction that is perpendicular to the first surface.

2. The switching mechanism as claimed in claim 1, wherein the sensing assembly further comprises a second reference object, and the second reference object is adjacent to the first sensing member when the movable portion is in a second condition.

3. The switching mechanism as claimed in claim 2, wherein the second reference object has a second surface facing the first sensing member, when the movable portion is in the second condition, the second reference object at least partially overlaps the first sensing member as observed from a direction that is perpendicular to the second surface, and the first surface and the second surface face different directions.

4. The switching mechanism as claimed in claim 3, wherein a connection line between a center of the first reference object and a center of the second reference object pass through the driving assembly.

5. The switching mechanism as claimed in claim 2, wherein as observed from the thickness direction of the first sensing member, the second sensing member and the first reference object do not overlap, and the first reference object and the second reference object do not overlap.

6. The switching mechanism as claimed in claim 2, wherein a direction of a magnetic line inside the first reference object and a direction of a magnetic line inside the second reference object are parallel to a moving direction of the movable portion, and the direction of the magnetic line inside the first reference object is opposite to the direction of the magnetic line inside the second reference.

7. The switching mechanism as claimed in claim 2, wherein the switching mechanism is disposed on an optical module, the movable portion covers the optical module when the movable portion is in the first condition, and the optical module is exposed from the movable portion when the movable portion is in the second condition.

8. The switching mechanism as claimed in claim 1, wherein a distance between the first sensing member and the second sensing member is greater than the distance between the first reference object and the second reference object.

9. The switching mechanism as claimed in claim 1, wherein a direction of a magnetic line inside the first reference object and a direction of a magnetic line inside the second reference object are perpendicular to a moving direction of the movable portion, and a magnetic pole on the first surface is opposite to a magnetic pole on a second surface of the second reference object facing the first sensing member.

10. The switching mechanism as claimed in claim 1, wherein a connection line between a center of the driving assembly and a center of the first sensing member does not pass through the first reference object.

11. The switching mechanism as claimed in claim 1, wherein when the driving assembly does not drive the movable portion to move, the driving assembly provides a fixing force to the movable portion, so that the movable portion is fixed relative to the fixed portion.

12. The switching mechanism as claimed in claim 11, wherein the driving assembly comprises:

a driving source, configured to generate a driving force;

a transferring member, configured to transfer the driving force; and a clamp member, wherein the clamp member is in contact with the transferring member and configured to generate the fixing force.

13. The switching mechanism as claimed in claim 12, wherein the driving assembly further comprises an enhancing member, configured to enhance the driving force of the driving source.

14. The switching mechanism as claimed in claim 12, wherein the driving source is a piezoelectric member.

15. The switching mechanism as claimed in claim 1, wherein the fixed portion comprises a cover and a base connected to each other, the movable portion comprises a plate section and two connecting sections, the plate section is movably disposed between the cover and the base, the two connecting sections are connected to the plate section and extend toward the base, and the first reference object and the second reference object are respectively disposed on the two connecting sections.

16. The switching mechanism as claimed in claim 15, wherein the base has a position-limiting pillar extending toward the cover, the plate section has a guiding slot, and the position-limiting pillar passes through the guiding slot.

17. The switching mechanism as claimed in claim 15, wherein the plate section has an opening, and the switching mechanism further comprises a filter disposed in the opening.

* * * * *